(12) United States Patent
Thakor et al.

(10) Patent No.: US 10,554,494 B1
(45) Date of Patent: Feb. 4, 2020

(54) AUTOMATIC ICCP PROVISIONING AND VLAN PROVISIONING ON AN INTER-CHASSIS LINK IN A MC-LAG

(71) Applicant: Juniper Networks, Inc., Sunnyvale, CA (US)

(72) Inventors: Shashvat A. Thakor, San Francisco, CA (US); Amit Shukla, Sunnyvale, CA (US); Rajeevalochan Ramaswamy, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 222 days.

(21) Appl. No.: 15/398,366

(22) Filed: Jan. 4, 2017

(51) Int. Cl.
*H04L 12/24* (2006.01)
*H04L 12/46* (2006.01)
*H04L 29/06* (2006.01)
*H04L 29/12* (2006.01)

(52) U.S. Cl.
CPC ...... *H04L 41/0873* (2013.01); *H04L 12/4645* (2013.01); *H04L 69/22* (2013.01); *H04L 41/0886* (2013.01); *H04L 41/5064* (2013.01); *H04L 61/6068* (2013.01)

(58) Field of Classification Search
CPC . H04L 41/0873; H04L 12/4645; H04L 69/22; H04L 61/6068; H04L 45/245; H04L 41/0803; H04L 41/0886; H04L 41/5054
See application file for complete search history.

(56) References Cited

U.S. PATENT DOCUMENTS

| 5,892,912 A | 4/1999 | Suzuki |
| 6,775,290 B1 | 8/2004 | Merchant et al. |
| 7,619,966 B2 | 11/2009 | Lee |

(Continued)

OTHER PUBLICATIONS

"Virtual PortChannel Quick Configuration Guide," Cisco Systems, Inc., 2009 (Applicant points out, in accordance with MPEP 609.04(a), that the year of publication, 2009, is sufficiently earlier than the effective U.S. filing date, Jan. 4, 2017 so that the particular month of publication is not in issue.) 9 pp.

(Continued)

*Primary Examiner* — Un C Cho
*Assistant Examiner* — Shah M Rahman
(74) *Attorney, Agent, or Firm* — Schumaker & Sieffert, P.A.

(57) ABSTRACT

Techniques are described for automatic provisioning of inter-control center communications protocol (ICCP) and automatic provisioning of virtual local area networks (VLANs) on an inter-chassis link (ICL) between multi-chassis link aggregation group (MC-LAG) peer devices. The MC-LAG peer devices may comprise two network devices included in an MC-LAG that is multi-homed to each of a plurality of MC-LAG client devices. In one example, the disclosed techniques enable detection of one or more VLANs configured on a multi-homed interface of the MC-LAG, and automatic provisioning of the detected VLANs on the ICL within the MC-LAG. In another example, the disclosed techniques enable determination of one or more ICCP parameters from MC-LAG configuration information, and automatic provisioning of ICCP over the ICL according to the determined ICCP parameters. The MC-LAG may be included within an enterprise switch of an enterprise network or within a data center switch of a data center network.

17 Claims, 5 Drawing Sheets

(56) References Cited

U.S. PATENT DOCUMENTS

| | | |
|---|---|---|
| 7,664,110 B1 | 2/2010 | Lovett et al. |
| 8,190,769 B1 | 5/2012 | Shukla et al. |
| 8,194,674 B1 | 6/2012 | Pagel et al. |
| 8,724,456 B1 * | 5/2014 | Hong ............... G06F 11/00 370/225 |
| 8,787,149 B1 * | 7/2014 | Ramanathan ........... H04L 45/58 370/216 |
| 8,806,058 B1 | 8/2014 | Mackie et al. |
| 9,419,919 B2 | 8/2016 | Goyal et al. |
| 2003/0120763 A1 | 6/2003 | Volpano |
| 2004/0250117 A1 | 12/2004 | Congdon |
| 2006/0002386 A1 | 1/2006 | Yik et al. |
| 2006/0007939 A1 | 1/2006 | Elangovan |
| 2007/0237148 A1 | 10/2007 | Jabr et al. |
| 2008/0049621 A1 | 2/2008 | McGuire et al. |
| 2008/0310421 A1 | 12/2008 | Teisberg et al. |
| 2009/0178119 A1 | 7/2009 | Macauley |
| 2010/0043068 A1 | 2/2010 | Varadhan et al. |
| 2010/0100611 A1 | 4/2010 | Hatasaki et al. |
| 2010/0165877 A1 | 7/2010 | Shukla et al. |
| 2010/0223397 A1 | 9/2010 | Elzur |
| 2010/0246388 A1 * | 9/2010 | Gupta ............... H04L 12/4625 370/225 |
| 2010/0332615 A1 | 12/2010 | Short et al. |
| 2011/0032945 A1 * | 2/2011 | Mullooly ............ H04L 45/58 370/401 |
| 2011/0103259 A1 | 5/2011 | Aybay et al. |
| 2011/0317699 A1 | 12/2011 | Assarpour |
| 2012/0016973 A1 | 1/2012 | Haris et al. |
| 2012/0033665 A1 * | 2/2012 | Jacob Da Silva .... H04L 45/245 370/389 |
| 2012/0033668 A1 * | 2/2012 | Humphries ........... H04L 12/185 370/390 |
| 2012/0033672 A1 * | 2/2012 | Page ................ H04L 45/245 370/395.53 |
| 2012/0117228 A1 | 5/2012 | Gabriel et al. |
| 2012/0155484 A1 * | 6/2012 | Sergeev ............ H04L 12/437 370/405 |
| 2012/0182866 A1 * | 7/2012 | Vinayagam ........... H04L 45/245 370/228 |
| 2012/0287936 A1 | 11/2012 | Biswas et al. |
| 2013/0121321 A1 | 5/2013 | Backes |
| 2013/0194914 A1 * | 8/2013 | Agarwal ............ H04L 45/245 370/225 |
| 2013/0230047 A1 | 9/2013 | Subrahmaniam et al. |
| 2013/0242983 A1 | 9/2013 | Tripathi et al. |
| 2014/0043964 A1 | 2/2014 | Gabriel et al. |
| 2014/0092901 A1 | 4/2014 | Kapadia et al. |
| 2014/0241353 A1 | 8/2014 | Zhang et al. |
| 2014/0269432 A1 | 9/2014 | Goyal et al. |
| 2014/0301401 A1 * | 10/2014 | Wang ................ H04L 49/70 370/395.53 |
| 2014/0321470 A1 | 10/2014 | Ookawa |
| 2014/0376558 A1 | 12/2014 | Rao et al. |
| 2015/0103692 A1 | 4/2015 | Jain et al. |
| 2015/0271010 A1 | 9/2015 | Shetty et al. |
| 2016/0043950 A1 | 2/2016 | Vobbilisetty et al. |
| 2016/0119229 A1 * | 4/2016 | Zhou ................. H04L 12/4633 370/392 |
| 2016/0301597 A1 * | 10/2016 | Jayakumar ........... H04L 45/245 |
| 2016/0301608 A1 * | 10/2016 | Natarajan ........... H04L 45/7453 |

OTHER PUBLICATIONS

"How to Bring up 'Junos Fusion Enterprise' Dual Aggregated System," J-Net Community, edited on Aug. 23, 2016, retrieved from http://forums.juniper.net/t5/tkb/articleprintpage/tkb-id/Switching_TKB/article-id/25, on Sep. 15, 2016, 9 pp.

"Implementing Multi-Chassis Trunking on Brocade Netlron Platforms," IP Network Implementation Guide, Brocade Communications Systems, Inc. 2010 (Applicant points out, in accordance with MPEP 609.04(a), that the year of publication, 2010, is sufficiently earlier than the effective U.S. filing date, Jan. 4, 2017 so that the particular month of publication is not in issue.) 21 pp.

"Multi-Chassis Link Aggregation," Arista Networks, retrieved on Sep. 15, 2016, 3 pp.

U.S. Appl. No. 14/502,379, by Juniper Networks (Inventors: Pinnamraju et al.), filed Sep. 30, 2014.

* cited by examiner

US 10,554,494 B1

AUTOMATIC ICCP PROVISIONING AND VLAN PROVISIONING ON AN INTER-CHASSIS LINK IN A MC-LAG

TECHNICAL FIELD

The invention relates to computer networks.

BACKGROUND

A computer network is a collection of interconnected computing devices that exchange data and share resources. In certain types of computer networks, such as enterprise networks, data center networks, and service provider access networks, administrators need to configure and manage large numbers of endpoint users or customers attempting to send and receive data through the network.

As one example, an enterprise network connects a plurality of remote enterprise sites that belong to a single enterprise, such as a university, corporation, business, or other large entity. Each of the enterprise sites may comprise a private network, such a local area network (LAN) or wide area network (WAN) that includes a plurality of customer devices, such as desktop computers, laptops, workstations, personal digital assistants (PDAs), Internet of Things (TOT) devices, wireless devices, network-ready appliances, file servers, print servers or other devices.

As another example, a data center network provides a plurality of customers with access to web sites, data, and services housed in a data center. A data center in its most simple form may consist of a single facility that hosts all of the infrastructure equipment, such as networking and storage systems, redundant power supplies, and environmental controls. More sophisticated data centers may be organizations spread throughout the world with subscriber support equipment located in various physical hosting facilities.

SUMMARY

In general, the disclosure describes techniques for automatic provisioning of inter-control center communications protocol (ICCP) and automatic provisioning of virtual local area networks (VLANs) on an inter-chassis link (ICL) between multi-chassis link aggregation group (MC-LAG) peer devices. The MC-LAG peer devices may comprise two network devices, also referred to as aggregation devices, included in an MC-LAG that is multi-homed to each of a plurality of MC-LAG client devices, also referred to as access devices or satellite devices. In one example, the disclosed techniques enable detection of one or more VLANs configured on a multi-homed interface of the MC-LAG, and automatic provisioning of the detected VLANs on the ICL within the MC-LAG. In another example, the disclosed techniques enable determination of one or more ICCP parameters from MC-LAG configuration information, and automatic provisioning of ICCP over the ICL according to the determined ICCP parameters.

In one example, this disclosure is directed to a method comprising configuring, by a first network device, a MC-LAG according to MC-LAG configuration information, the MC-LAG including the first network device and a second network device connected to the first network device by an inter-chassis link, receiving, at a multi-homed interface of the MC-LAG on the first network device, data packets from a satellite device, detecting, by the first network device, one or more VLANs configured on the multi-homed interface, and automatically provisioning, by the first network device, the detected one or more VLANs on the inter-chassis link connecting the first network device and the second network device within the MC-LAG.

In another example, this disclosure is directed to a network device comprising a memory configured to store MC-LAG configuration information, and one or more processors in communication with the memory. The one or more processors are configured to configure a MC-LAG according to the MC-LAG configuration information, the MC-LAG including the network device and another network device connected to the network device by an inter-chassis link, receive, at a multi-homed interface of the MC-LAG on the network device, data packets from a satellite device, detect one or more VLANs configured on the multi-homed interface, and automatically provisioning, by the first network device, the detected one or more VLANs on the inter-chassis link connecting the first network device and the second network device within the MC-LAG.

In a further example, this disclosure is directed to a non-transitory computer-readable storage medium storing instructions that when executed cause one or more programmable processors of a first network device to configure a MC-LAG according to MC-LAG configuration information, the MC-LAG including the first network device and a second network device connected to the first network device by an inter-chassis link, receive, by a multi-homed interface of the MC-LAG on the first network device, data packets from a satellite device, detect one or more VLANs configured on the multi-homed interface, and automatically provision the detected one or more VLANs on the inter-chassis link connecting the first network device and the second network device within the MC-LAG.

The details of one or more examples of this disclosure are set forth in the accompanying drawings and the description below. Other features, objects, and advantages of the disclosure will be apparent from the description and drawings, and from the claims.

DETAILED DESCRIPTION

Figure 1:
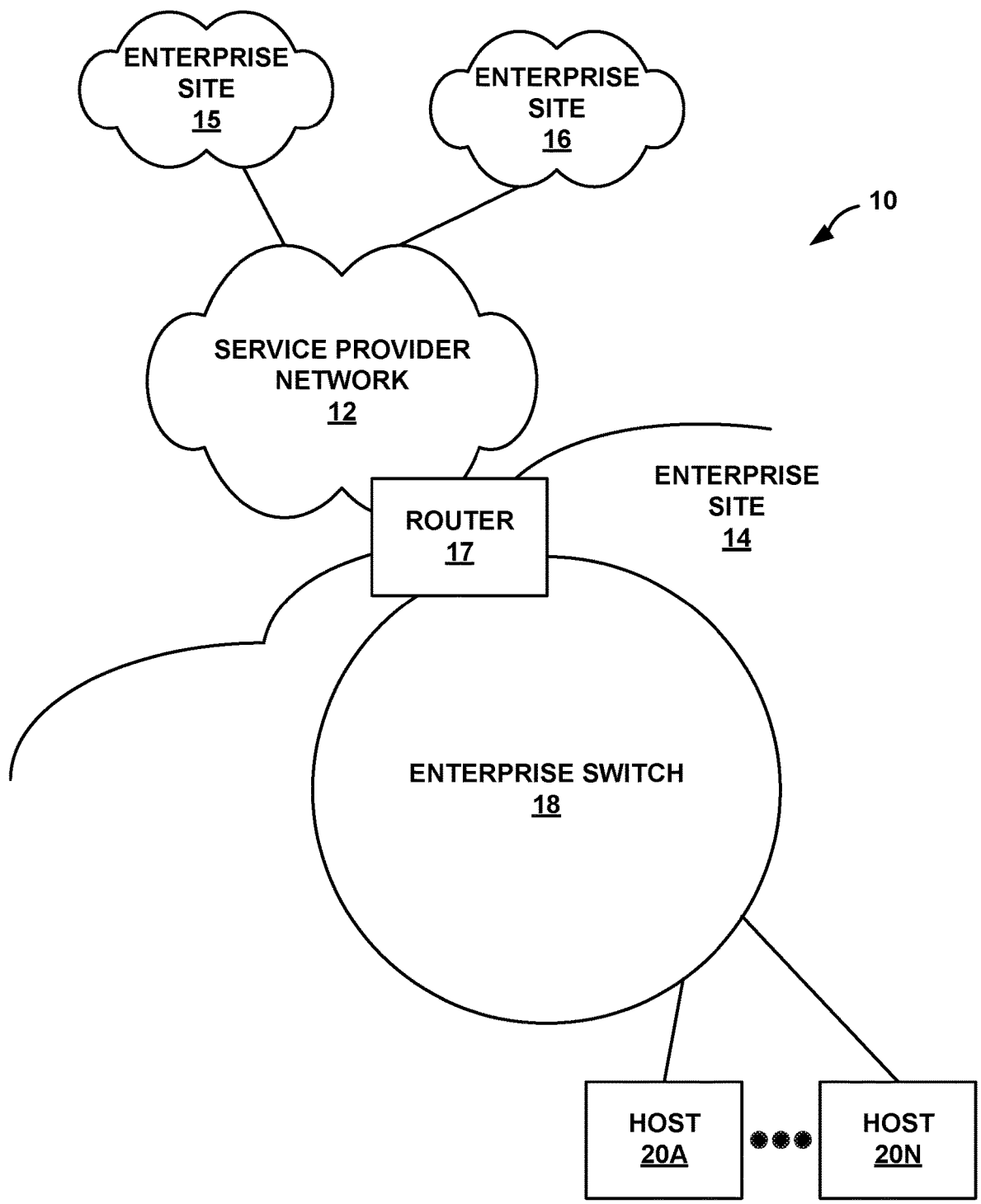
FIG. 1 is a block diagram illustrating an example enterprise network with an enterprise switch configured to operate in accordance with the techniques of this disclosure.

FIG. 1 is a block diagram illustrating an example enterprise network 10 with an enterprise site 14 having an enterprise switch 18 configured to operate in accordance with the techniques of this disclosure. Enterprise switch 18 manages connectivity between hosts or endpoints within enterprise network 10, including local hosts 20A-20N (collectively "hosts 20") within enterprise site 14 as well as hosts included in enterprise sites 15 and 16.

Enterprise sites 14, 15, and 16 may be geographically separated enterprise sites that belong to a single enterprise, such as a university, corporation, business, or other large entity. Each of the enterprise sites 14, 15, and 16 may comprise a private network, such a local area network (LAN) or wide area network (WAN) that includes a plurality of hosts, e.g., hosts 20 within enterprise site 14. As an example, hosts 20 may include data servers, switches, or customer devices, such as desktop computers, laptops, workstations, personal digital assistance (PDAs), Internet of Things (TOT) devices, wireless devices, network-ready appliances, file servers, print servers or other devices.

One or more hosts (not shown) within enterprise sites 15 and 16 may be logically connected to one or more of hosts 20 within enterprise site 14 across service provider network 12. The hosts within each of the enterprise sites 14, 15, and 16 may each be included in one or more virtual LANs (VLANs), which are groups of devices on one or more LANs that are configured to communicate as if they are attached to the same wire. Enterprise switch 18 may be configured to provide hosts 20 with access to service provider network 12 via router 17, and to provide hosts 20 with connectivity for host-to-host traffic within enterprise site 14. Service provider network 12, in turn, provides hosts within enterprise sites 15 and 16, with access to enterprise switch 18 within enterprise site 14.

Service provider network 12 may be coupled to one or more networks (not shown) administered by other providers, and may thus form part of a large-scale public network infrastructure, e.g., the Internet. Service provider network 12, therefore, may provide hosts or endpoints within enterprise sites 14, 15, and 16 with access to the Internet. Router 17 may perform Layer 3 routing to route network traffic between enterprise switch 18 and enterprise sites 15, 16 using service provider network 12. Service provider network 12 may include a variety of network devices other than router 17, such as other provider edge (PE) routers, core routers, customer edge (CE) routers, and switches.

Although additional network devices are not shown for ease of explanation, enterprise network 10 may comprise additional networks, enterprise sites, and/or data centers including, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of enterprise network 10 are illustrated as being directly coupled, one or more additional network elements may be included along any links between service provider network 12 and enterprise sites 14, 15, or 16, and any links between enterprise switch 18 and hosts 20, such that the network elements of enterprise network 10 are not directly coupled.

Although illustrated as a single switch in FIG. 1, enterprise switch 18 may include a plurality of network devices, e.g., routers and/or switches. For example, enterprise switch 18 may include a plurality of access or satellite devices interconnected via one or more aggregation devices. In some examples, the architecture of enterprise switch 18 comprises a multi-tiered architecture in which two tiers of access or satellite devices and aggregation devices are interconnected to forward data packets between hosts 20 within enterprise site 14 and from hosts 20 to other hosts within enterprise sites 15, 16 via service provider network 12.

As described in more detail below with respect to FIG. 2, at least two aggregation devices included in enterprise switch 18 may be configured to operates as multi-chassis link aggregation group (MC-LAG) peer devices within a MC-LAG that is multi-homed to at least two of access or satellite devices, also referred to as MC-LAG client devices. The MC-LAG, which includes an active MC-LAG peer device and a standby MC-LAG peer device connected via an inter-chassis link (ICL) for inter-chassis redundancy, may provide high availability of enterprise switch 18 within enterprise network 10. An inter-control center communications protocol (ICCP) may be used to exchange control information between the MC-LAG peer devices and to coordinate data forwarding over the ICL between the MC-LAG peer devices.

In general, the techniques of this disclosure are described with respect to an enterprise switch in an enterprise network used to provide access between hosts within the enterprise network. In other examples, the techniques of the disclosure may be similarly performed within a data center switch included in a data center network used to provide hosts with access to web sites, data, and services housed in a data center. In still other examples, the techniques of this disclosure may be applied to any other large-scale switch that includes an MC-LAG between access and aggregation layers of the switch.

In some examples, a user or administrator associated with an enterprise switch may be required to manually configure VLANs on an ICL between MC-LAG peer devices within the enterprise switch. Similarly, the user or administrator may be required to manually configure ICCP on another link between the MC-LAG peer devices. This manual configuration may become increasingly difficult, if not impossible, in cases where frequently changing VLAN configurations need to be manually updated on the ICL between MC-LAG peer devices within the MC-LAG.

In other examples, an external tool or orchestration software may be used to configure VLANs on an ICL between MC-LAG peer devices within an enterprise switch. These tools may configure the enterprise switch through its management plane. Configuring through the management plane, however, may increase the load on network management and control plane systems of the enterprise switch, which may result in scaling issues.

This disclosure describes techniques for automatic provisioning of ICCP and automatic provisioning of VLANs on the ICL between the MC-LAG peer devices. In one example, the disclosed techniques enable detection of one or more VLANs configured on a multi-homed interface of the MC-LAG, and automatic provisioning of the detected VLANs on the ICL within the MC-LAG. In another example, the disclosed techniques enable determination of one or more ICCP parameters from MC-LAG configuration information, and automatic provisioning of ICCP over the ICL according to the determined ICCP parameters.

Figure 2:
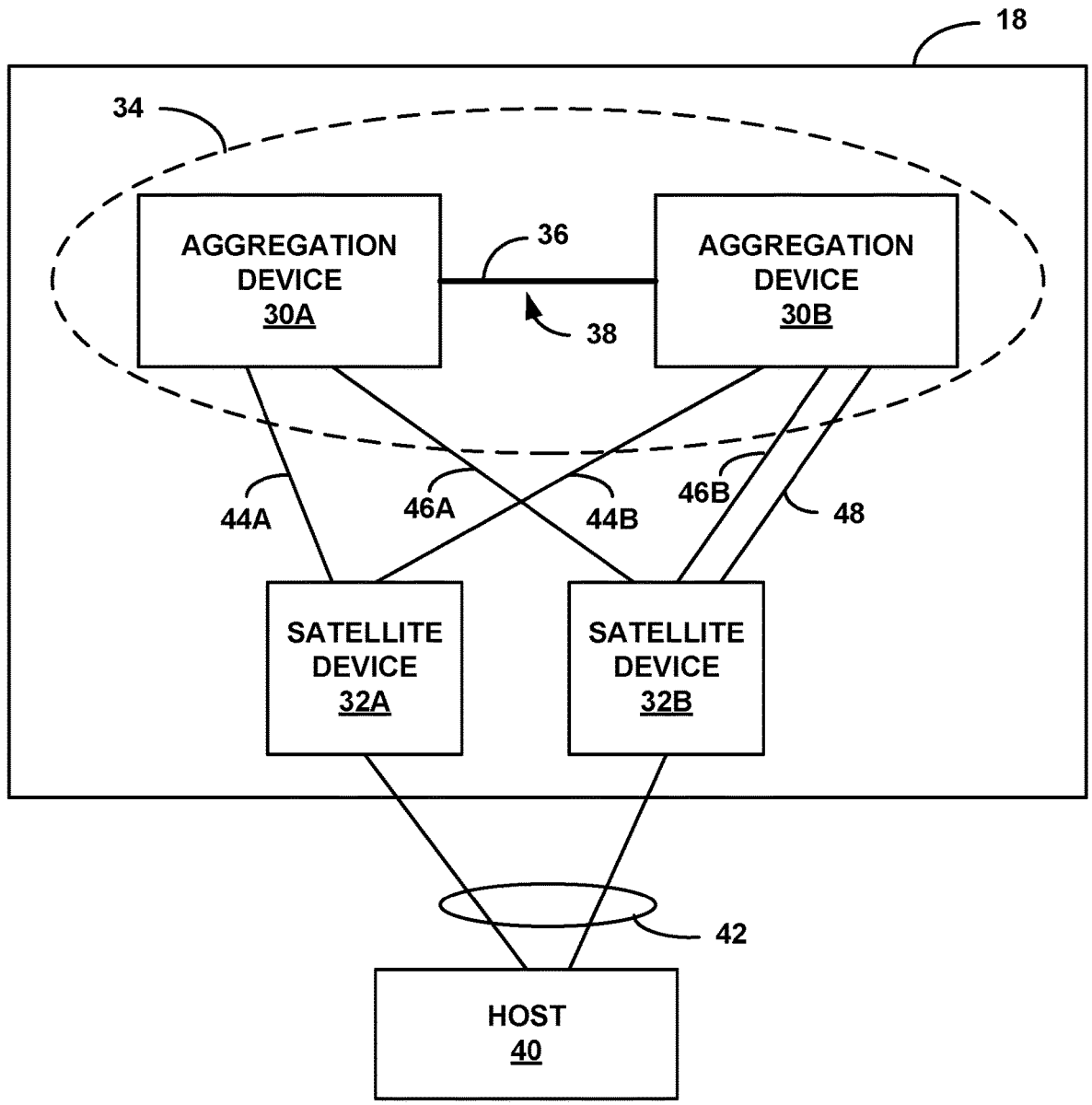
FIG. 2 is a block diagram illustrating an example of an enterprise switch including peer aggregation devices within a MC-LAG that are configured to operate in accordance with the techniques of this disclosure.

FIG. 2 is a block diagram illustrating an example of enterprise switch 18 including peer aggregation devices 30A and 30B (collectively "aggregation devices 30") within a MC-LAG 34 that are configured to operate in accordance with the techniques of this disclosure. The architecture illustrated in FIG. 2 is merely exemplary and, in other examples, enterprise switch 18 may conform to a different architecture.

Satellite devices 32A and 32B (collectively "satellite devices 32") form the access layer of enterprise switch 18 and provide host 40 with access to the internal switch fabric of enterprise switch 18. In FIG. 2, host 40 is illustrated as being multi-homed to each of satellite devices 32 via a link aggregation group (LAG) 42. In other examples, a plurality of hosts may be connected, either multi-homed or singularly homed, to one or more of satellite devices 32. Satellite devices 32 may provide layer 2, medium access control (MAC) address switching and/or layer 3, Internet Protocol (IP) address switching between the hosts. The host-facing ports of satellite devices 32 are referred to herein as extended ports and may be capable of carrying traffic for only one VLAN.

Each of satellite devices 32 is connected to each of aggregation devices 30 within MC-LAG 34. The MC-LAG facing ports of satellite devices 32 are referred to herein as trunk ports that are capable of carrying traffic for two or more VLANs. Aggregation devices 30 comprise the fabric interconnect backbone of enterprise switch 18 by providing layer 2 switching functionality to transfer data between connections of satellite devices 32. More specifically, each of aggregation devices 30 includes front cards with multiple ports to receive and send data with satellite devices 32, and rear cards with at least an ICL port to transfer data between the aggregation devices 30. The satellite device-facing ports of aggregation devices 30 are referred to herein as trunk ports that are capable of carrying traffic for two or more VLANs.

As illustrated in FIG. 2, aggregation devices 30 are included within MC-LAG 34 so as to appear as a single chassis to satellite devices 32. One of peer aggregation devices 30, e.g., aggregation devices 30A, may be configured to operate as an active MC-LAG peer device that is responsible for transferring data between MC-LAG 34 and satellite devices 32. The other one of peer aggregation devices 30, e.g., aggregation devices 30B, may be configured to operate as a standby MC-LAG peer device. MC-LAG peer aggregation devices 30 are connected to each other via ICL 36 over which aggregation devices 30 may exchange data packets. ICL 36 may be established according to MC-LAG configuration information provided to active MC-LAG aggregation device 30A, for example. ICL 36 may be considered a backup link that provides inter-chassis redundancy in the case of a link failure between the active MC-LAG peer device, e.g., aggregation device 30A, and at least one of satellite devices 32. In this way, through inter-chassis redundancy, the standby MC-LAG peer device, e.g., aggregation device 30B, may provide high availability of enterprise switch 18.

In addition, within MC-LAG 34, ICCP 58 may be provisioned over ICL 36 or over a separate link to exchange control information between aggregation devices 30 to provide inter-chassis redundancy with respect to state information, such as MAC address learning and installation. In addition, in the case of a link failure between the active MC-LAG peer device, e.g., aggregation device 30A, and at least one of satellite devices 32, ICCP 58 may be used to coordinate data forwarding from aggregation device 30A to aggregation device 30B.

As further illustrated in FIG. 2, the apparent single chassis, formed by aggregation devices 30 within MC-LAG 34, is multi-homed to each of satellite devices 32. Each of aggregation devices 30 includes multi-homed interfaces of MC-LAG 34 that connect to each of satellite devices 32. For example, aggregation device 30A includes a multi-homed interface 44A and aggregation device 30B includes a multi-homed interface 44B that are both connected to satellite device 32A. Similarly, aggregation device 30A includes a multi-homed interface 46A and aggregation device 30B includes a multi-homed interface 46B that are both connected to satellite device 32B. In addition, aggregation device 30B includes a singularly homed interface 48 connected to satellite device 32B. Multi-homed interfaces 44, 46 may be multi-chassis aggregated Ethernet (MCAE) interfaces of MC-LAG 34 included on each of peer aggregation devices 30 within MC-LAG 34. Each of interfaces 44, 46, 48 may be considered a trunk interface that is capable of carrying traffic for two or more VLANs.

According to the disclosed techniques, aggregation devices 30 are configured to automatically provision ICCP 38 over ICL 36, and automatically provision VLANs on ICL 36. In some examples, the disclosed techniques may be performed by the active MC-LAG peer device, e.g., aggregation device 30A. However, either of aggregation devices 30 included MC-LAG 34 may be configured to perform the disclosed techniques.

In one example, the disclosed techniques enable aggregation device 30A to determine one or more ICCP parameters from MC-LAG configuration information, and automatically provision ICCP 38 over the ICL 36 according to the determined ICCP parameters. Automatic provisioning of ICCP 38 over ICL 36 simplifies the MC-LAG configuration by automatically provisioning the ICCP parameters, instead of requiring the customer to manually configure all ICCP parameters. Automatically provisioning ICCP 38 retains the existing benefits of ICCP 38, such as inter-chassis redundancy of state information and coordination of data forwarding to achieve high availability of enterprise switch 18. A user or administrator associated with enterprise switch 18 may not be aware of the need to apply ICCP configuration in a MC-LAG based solution, and the disclosed techniques keep ICCP configuration transparent to the user or administrator.

In another example, the disclosed techniques enable aggregation device 30A to detect one or more VLANs configured on one of multi-homed interfaces 44, 46 of MC-LAG 34, and automatically provision the detected VLANs on ICL 36 within MC-LAG 34. Automatic VLAN provisioning on ICL 36 simplifies the MC-LAG configuration by automatically configuring the VLANs on ICL 36 that are present on multi-homed interfaces 44A, 46A on aggregation device 30A that face satellite devices 32. Upon configuration of the VLANs on ICL 36, the data packets received from satellite devices 32 on multi-homed interfaces 44A, 46A may be seamlessly forwarded from aggregation device 30A to aggregation device 30B over ICL 36. ICL 36 provides inter-chassis redundancy when a link failure on one of the trunk ports occurs on an active link between active MC-LAG peer aggregation device 30A and one of satellite devise 32.

This way, in the multi-homed cluster of MC-LAG 34, a user or administrator is not required to manually configure a VLAN list for ICL 36 between the MC-LAG peer aggregation devices 30. In addition, if the VLAN configuration is changed on the dual-homed interfaces 44, 46, the user or administrator does not need to make manual updates to the VLAN list for ICL 36. According to the disclosed techniques, active MC-LAG peer aggregation devices 30A instead learns the VLAN changes on the multi-homed interfaces 44A, 46A and extended ports of satellite devices 32, and automatically configures the VLAN list for ICL 36.

In the example architecture of enterprise switch 18 illustrated in FIG. 2, aggregation devices 30 within MC-LAG 34 are multi-homed to satellite devices 32. The aggregation devices 30 are MC-LAG peers connected via ICL 36.

Automatic provisioning of ICCP 38 over ICL 36 is achieved using the multi-homed configuration on the MC-LAG peer aggregation devices 30. Also, VLANs provisioned on multi-homed interfaces 44 and 46 facing satellite devices 32 are automatically provisioned on ICL 36. The automatic VLAN provisioning may be useful in achieving redundancy of a typical MC-LAG based solution, e.g., if one of satellite devices 32 loses connection with one of aggregation devices 30, data traffic may be forwarded to the other one of aggregation devices 30 via ICL 36.

The techniques of this disclosure may provide several benefits. First, a user or administrator sees the entire multi-homed MC-LAG topology of enterprise switch 18 as a single chassis, and, hence, less configuration is required for MC-LAG 34. Second, by automatically provisioning the VLANs on ICL 36, the administrator does not need to manually configure VLANs on ICL 36 whenever VLAN membership of multi-homed interfaces 44, 46 changes. Third, automatically provisioning the VLANs on ICL 36 provides a more scalable solution applicable to large-scale switching devices. Fourth, by automatically provisioning the VLANs on ICL 36, ICL 36 does not need to carry traffic for all of the VLANs such that traffic isolation between aggregation devices 30 may be achieved. For example, traffic carried on singular homed trunk interface 48 may be local to aggregation device 30B, and the one or more VLANs configured on singular homed trunk interface 48 may not be configured on ICL 36 because trunk interface 48 is not a multi-homed interface. In general, according to the disclosed techniques, zero-touch provisioning of ICCP 38 over ICL 36 and VLANs on ICL 36 is achieved.

The disclosed techniques may be especially useful in examples where host 40 and other similar hosts are connected to virtual machines (VMs) that frequently move from one port to another. In this example, the VLAN assignments on the extended ports of satellite devices 32 facing host 40 and, subsequently, on the trunk interfaces between satellite devices 32 and aggregation device 30, may change frequently. The frequently changing VLAN assignments results in a need for frequent updating of the VLANs configured on ICL 36 between MC-LAG peer aggregation devices 30. In one example, a VM may move from one multi-homed interface, e.g., 44A, on active MC-LAG aggregation device 30A to another multi-homed interface, e.g., 46A, on active MC-LAG aggregation device 30A. According to the disclosed techniques, aggregation device 30A may sense a new VLAN assignment based on a VLAN tag included with the traffic ingressing on multi-homed interface 46A, and trigger automatic provisioning of the new VLAN on ICL 36.

Figure 3:
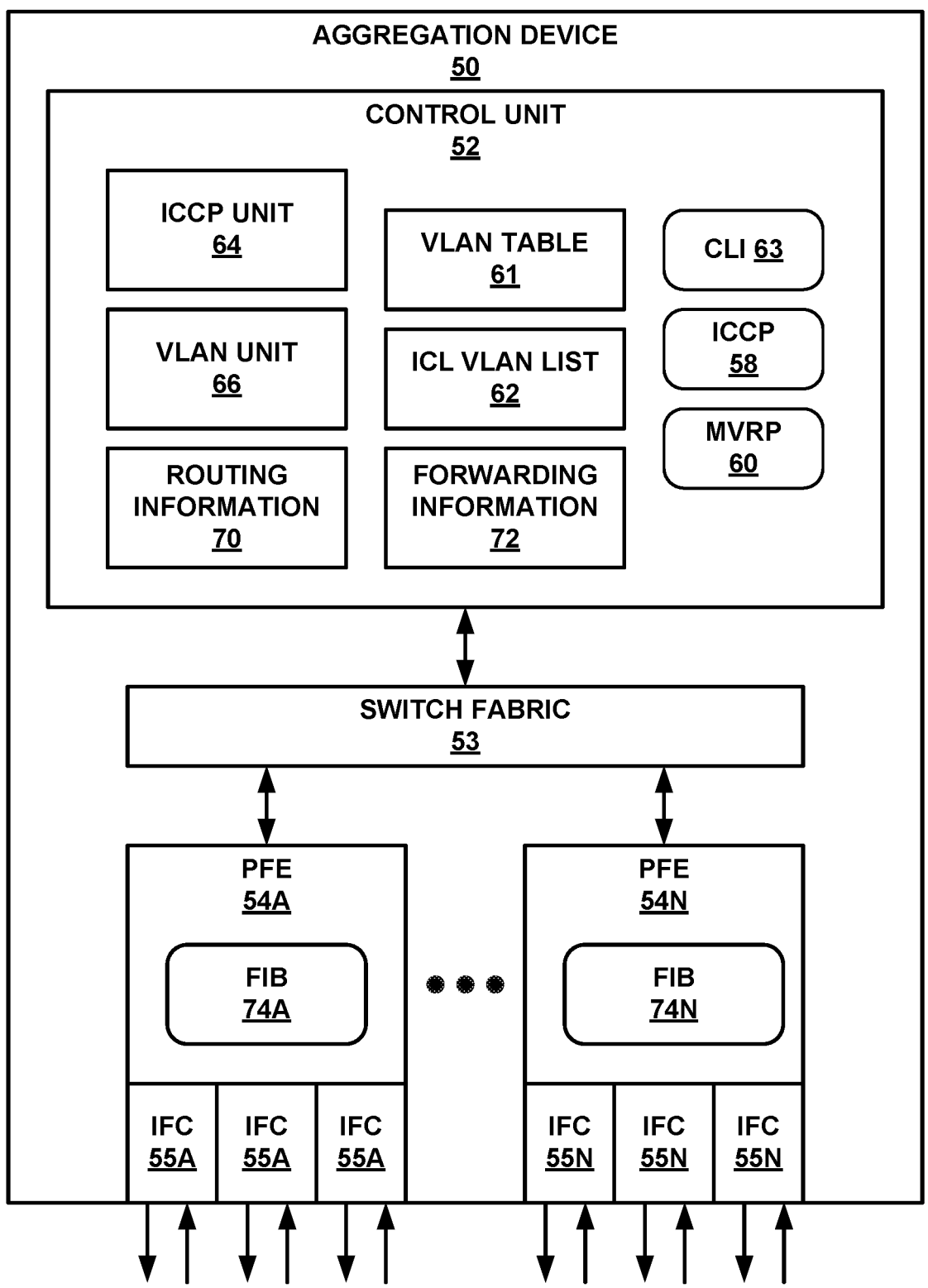
FIG. 3 is a block diagram illustrating an example of an aggregation device within an enterprise switch, in accordance with techniques of this disclosure.

FIG. 3 is a block diagram illustrating an example of an aggregation device 50 within an enterprise switch, such as enterprise switch 18 from FIGS. 1 and 2, in accordance with techniques of this disclosure. Aggregation device 50 may comprise a network device, such as a router and/or a switch. Aggregation device 50 may be configured to operate as one of an active MC-LAG peer device or a standby MC-LAG peer device within a MC-LAG, such as MC-LAG 34 from FIG. 2. In this disclosure, aggregation device 50 is described as an active MC-LAG peer device configured to operate substantially similar to active MC-LAG peer aggregation device 30A from FIG. 2.

In the illustrated example of FIG. 3, aggregation device 50 includes a control unit 52 that provides control plane functionality for the network device. Aggregation device 50 also includes switch fabric 53 interconnecting a set of packet-forwarding engines 54A-54N ("PFEs 54") that send and receive traffic by a set of interface cards 55A-55N (collectively "IFCs 55") that typically have one or more physical network interface ports. PFEs 54 and switch fabric 53 collectively provide a forwarding plane for forwarding network traffic. As shown in FIG. 3, each of PFEs 54 includes one of forwarding information bases (FIBs) 74A-74N (collectively "FIBs 74") that stores forwarding data structures installed by control unit 52. Although not shown in FIG. 3, PFEs 54 may each comprise a central processing unit (CPU), memory and one or more programmable packet-forwarding application-specific integrated circuits (ASICs). Switch fabric 53 provides a high-speed interconnect for packet switching and forwarding incoming data packets between PFEs 54 for transmission over a network.

Control unit 52 provides an operating environment for various protocols that perform control plane functions for aggregation device 50. For example, control unit 52 may include one or more control and routing protocols such as border gateway protocol (BGP), internal gateway protocol (IGP), label distribution protocol (LDP) and/or resource reservation protocol (RSVP). In some examples, the IGP may comprise the open shortest path first (OSPF) protocol or the intermediate system-to-intermediate system (IS-IS) protocol. Control unit 52 also may include one or more daemons that comprise user-level processes that run network management software, execute routing protocols to communicate with peer routers or switches, maintain and update one or more routing tables, and create one or more forwarding tables for installation to PFEs 54, among other functions.

As one example, control unit 52 includes a command-line interface ("CLI") 63. CLI 63 provides a shell by which a user or an administrator may modify the configuration of aggregation device 50 using text-based commands. As another example, a routing protocol daemon (RPD) (not shown) may use one of the routing protocols included in control unit 52 as a link state routing protocol to advertise a topology of the network. Control unit 52 maintains routing information 70 that defines routes to destinations within the network and topology data that represents the overall topology of the network. Routing information 70 may include, for example, route data that describes various routes within the network, and corresponding next hop data indicating appropriate neighboring devices within the network for each of the routes. Aggregation device 50 updates routing information 70 based on received advertisements to accurately reflect the topology of the network. Based on routing information 70, control unit 52 generates forwarding information 72 and installs forwarding data structures into forwarding information bases (FIBs) 74 within PFEs 54 in the forwarding plane. FIBs 74 associate network destinations with specific next hops and corresponding interface ports within the forwarding plane.

In the example of FIG. 3, control unit 52 is connected to each of PFEs 54 by a dedicated internal communication link and switch fabric 53. For example, the dedicated link may comprise a 200 Mbps or Gigabit Ethernet connection for internal communication between the multiple components of aggregation device 50. In one embodiment, control unit 52 communicates data representative of FIBs 74 into PFEs 54 to program the PFEs 54 and thereby control forwarding of traffic by the corresponding components within the forwarding plane. This allows FIBs 74 stored in memory (e.g., on-chip RAM) in PFEs 54 to be updated without degrading packet-forwarding performance of aggregation device 50. In some instances, control unit 52 may derive a separate and different one of FIBs 74 for each of the respective PFEs 54. In addition, one or more of PFEs 54 may include packet-forwarding ASICs (not shown in FIG. 3) that PFEs 54 program with a hardware-copy FIB based on the one of FIBs 74 (i.e., hardware versions of the software FIBs) in each of the respective PFEs 54.

PFEs 54 process packets by performing a series of operations on each packet over respective internal packet forwarding paths as the packets traverse the internal architecture of aggregation device 50. Operations may be performed, for example, on each packet by any of a corresponding ingress interface port, an ingress one of PFEs 54, an egress one of PFEs 54, an egress interface port or other components of aggregation device 50 to which the packet is directed prior to egress. PFEs 54 each include forwarding data structures within FIBs 74 that, when executed, examine the contents of each packet and, on that basis, make forwarding decisions, apply filters, and/or perform accounting, management, traffic analysis, and load balancing, for example. The result of packet processing determines the manner in which a packet is forwarded or otherwise processed by PFEs 54 from its ingress interface port on one of IFCs 55 to its egress interface port on one of IFCs 55.

The techniques described in this disclosure provide zero touch provisioning by auto provisioning ICCP 58 over an ICL between aggregation device 50 and its MC-LAG peer device, and auto provisioning VLANs on the ICL between aggregation device 50 and its MC-LAG peer device.

As illustrated in FIG. 3, control unit 54 includes ICCP unit 64 configured to determine of one or more ICCP parameters from MC-LAG configuration information, and automatically provision ICCP 58 over the ICL according to the determined ICCP parameters. In some examples, ICCP unit 64 may comprises a daemon, e.g. ICCPD, on control unit 52.

In some conventional examples, ICCP unit 64 may be used to manually configure ICCP 58 over a separate link between aggregation device 50 and its MC-LAG peer device based on ICCP configuration information received from a user or administrator via CLI 63. According to the disclosed techniques, ICCP unit 64 is configured to automatically provision ICCP 58 over the ICL between aggregation device 50 and its MC-LAG peer device. The ICL is typically established based on MC-LAG configuration information provided to active MC-LAG aggregation device 50. In this case, because ICCP unit 64 provisions ICCP 58 over the ICL, ICCP unit 64 may pull the needed ICCP parameters from the MC-LAG configuration information.

ICCP unit 64 parses the MC-LAG configuration information and extracts the information needed to determine the ICCP parameters to automatically provision ICCP 58 over the ICL. For example, the following CLI code may be used to configure the MC-LAG:

redundancy-groups {
    chassis-id<local-chassis-id>;
    redundancy-group {
       redundancy-group-id<redundancy-group-id>;
       peer-chassis-id<peer-chassis-id>    inter-chassis-link
          <interface-name>;
    }
    }

ICCP unit 64 extracts the local-chassis-id, the redundancy-group-id, and the peer-chassis-id from the MC-LAG configuration code lines. ICCP unit 64 then determines the following ICCP parameters:

1. local-ip-addr ipv4-address, which is the local IP address for active MC-LAG peer aggregation device 50, from the local-chassis-id extracted from the MC-LAG configuration information. The IP address may be 10.0.0.1 or 10.0.0.2 based on the local-chassis-id.

2. redundancy-group-id-list [redundancy-groups], which is a list of redundancy groups to which active MC-LAG peer aggregation device 50 belongs, from the redundancy-group-id extracted from the MC-LAG configuration; and 3. peer-ip-addr ipv4-address, which is the peer IP address for the standby MC-LAG peer device within the MC-LAG, from the peer-chassis-id extracted from the MC-LAG configuration information. The IP address may be 10.0.0.1 or 10.0.0.2 based on the peer-chassis-id.

In some example, a user or administrator may manually configure ICCP 58 for a redundancy group x. In such a case, the manual configuration may override the automatic ICCP provisioning for the redundancy group x.

Whenever ICL interfaces are created in a multi-homed aggregation device topology, e.g., an MC-LAG internally two interfaces are also created, i.e., one for the control plane and one for the data plane. In the case where 0.32769 is a control plane subunit and 0.32770 is a data plane subunit, the following is an example set of commands for auto provisioning ICCP:

root@router # run show interfaces terse

| Interface | Admin Link Proto | Local | Remote |
|---|---|---|---|
| et-0/0/30.0 | up | up | eth-switch |
| et-0/0/30.32769 | up | up | inet 10.0.0.1/30 |
| et-0/0/30.32770 | up | up | eth-switch | root router # run show iccp
Redundancy Group Information for peer 10.0.0.2

| TCP Connection: | Established |
|---|---|
| Liveliness Detection: | Up |
| Redundancy Group ID | Status |
| 1 | Up |

As illustrated in FIG. 3, control unit 54 includes VLAN unit 66 configured to detect one or more VLANs configured on multi-homed interfaces of the MC-LAG on aggregation device 50, and automatically provision the detected VLANs on the ICL between aggregation device 50 and its MC-LAG peer device. In one example, VLAN unit 66 may detect the one or more VLANs based on one or more VLAN tags included in data packets received from satellite devices on the multi-homed interfaces of aggregation device 50, the one or more VLAN tags identifying the one or more VLANs. In another example, VLAN unit 66 may detect the one or more VLANs on the multi-homed interfaces on aggregation device 50 from VLAN table 61. VLAN table 61 may identify both manually configured VLANs and automatically configured VLANs on the multi-homed interfaces and other trunk interfaces on aggregation device 50.

In some examples, one or more VLANs may also be manually configured on the trunk interfaces of aggregation device 50 by a user or administrator via CLI 63. In other examples, VLAN unit 66 may use multiple VLAN registration protocol (MVRP) 60 to automatically configure VLANs on the trunk interfaces of aggregation device 50 based on VLAN registration information received in MVRP packets. The VLAN registration information sent in MVRP packets may include current VLANs membership that indicate which network devices are members of which VLANs and which interfaces are in which VLAN. VLAN unit 66 of aggregation device 50 may receive MVRP packets during state changes and update MVRP states accordingly. In either case, the configured VLANs on each of the trunk interfaces of aggregation device 50 may be recorded in VLAN table 61.

According to the disclosed techniques, VLAN unit 66 automatically provisions the detected one or more VLANs on the ICL connecting aggregation device 50 and the other aggregation device within the MC-LAG. For example, VLAN unit 66 may automatically configure ICL VLAN list 62 to include the detected one or more VLANs for the ICL. ICL VLAN list 62 may also include at least one manually configured VLAN on the ICL. In this example, aggregation device 50 may receive the manual configuration information for the at least one VLAN on the ICL from the user or administrator via CLI 63. VLAN unit 66 may also continue to detect any changes to the VLANs configured on the multi-homed interface in order to automatically update ICL VLAN list 62 for the ICL.

In general, VLAN unit 66 updates the ICL VLAN membership based on the VLAN membership on the multi-homed interfaces of aggregation device 50 facing the satellite devices and/or the VLAN membership on the extended ports of the satellite devices. In this way, a user or administrator does not need to manually configure or update the ICL VLAN memberships every time the VLAN membership on the satellite devices changes, whether adding or deleting VLANs. According to the disclosed techniques, the administrator may still manually configure VLANs on the ICL irrespective of whether automatic VLAN provisioning is enabled or not. In this case, both VLANs learned from automatic VLAN provisioning and configured manually will be added to ICL VLAN list 62. When the automatic VLAN provisioning on the ICL is disabled, the VLANs that were configured manually for the ICL will be retained. VLAN unit 66 learns of the VLAN membership on satellite devices that are changed either by static configuration by the administrator on the multi-homed interfaces or by an auto-sense VLAN feature on the multi-homed interfaces.

In the case where et-0/0/0 is the ICL having v1 and xe-102/0/32 is the satellite multi-chassis aggregated Ethernet (MCAE) interface on the MC-LAG having v100 in the VLAN configuration, a VLAN membership for v100 is auto provisioned on the ICL. The following is an example set of commands for auto provisioning VLAN v100:

root router # run show vlans

| Routing Instance Name: default-switch | | | |
|---|---|---|---|
| Routing instance | VLAN name | Tag | Interfaces |
| default-switch | v1 | 1 | et-0/0/0.0 |
| default-switch | v100 | 100 | et-0/0/0.0 |
| | | | xe-102/0/32.0 |

In some examples, the above disclosed techniques may be extended beyond automatic provisioning of ICCP and VLANs on the ICL, to any feature that needs to be enabled on the ICL. As one example, the disclosed techniques may be used to enable the ICL to carry multicast traffic, e.g., the ICL being a mrouter port, between aggregation device 50 and its MC-LAG peer device. As another example, the disclosed techniques may be used to enable the ICL to carry traffic conforming to one or more protocols between aggregation device 50 and its MC-LAG peer device.

The architecture of aggregation device 50 illustrated in FIG. 3 is shown for exemplary purposes only. The disclosure is not limited to this architecture. In other embodiments, aggregation device 50 may be configured in a variety of ways. In one embodiment, for example, some of the functionally of control unit 52 may be distributed within PFEs 54.

The operating environment of control unit 52 may be implemented solely in software, or hardware, or may be implemented as a combination of software, hardware or firmware. For example, control unit 52 may include one or more processors, one or more microprocessors, digital signal processors (DSPs), application specific integrated circuits (ASICs), application specific special processors (ASSP), field programmable gate arrays (FPGAs), or any other equivalent integrated or discrete logic circuitry, or any combination thereof, which execute software instructions. In that case, control unit 52 may include various software modules or daemons executing on an operating system, and may include executable instructions stored, embodied, embedded, or encoded in a non-transitory computer-readable storage medium, such as computer memory or hard disk. Instructions stored in a computer-readable medium may cause a programmable processor, or other processor, to perform methods described herein, e.g., when the instructions are executed.

Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of aggregation device 50, e.g., protocols. Control unit 52, in some examples, retrieves and executes the instructions from memory for these aspects.

Figure 4:
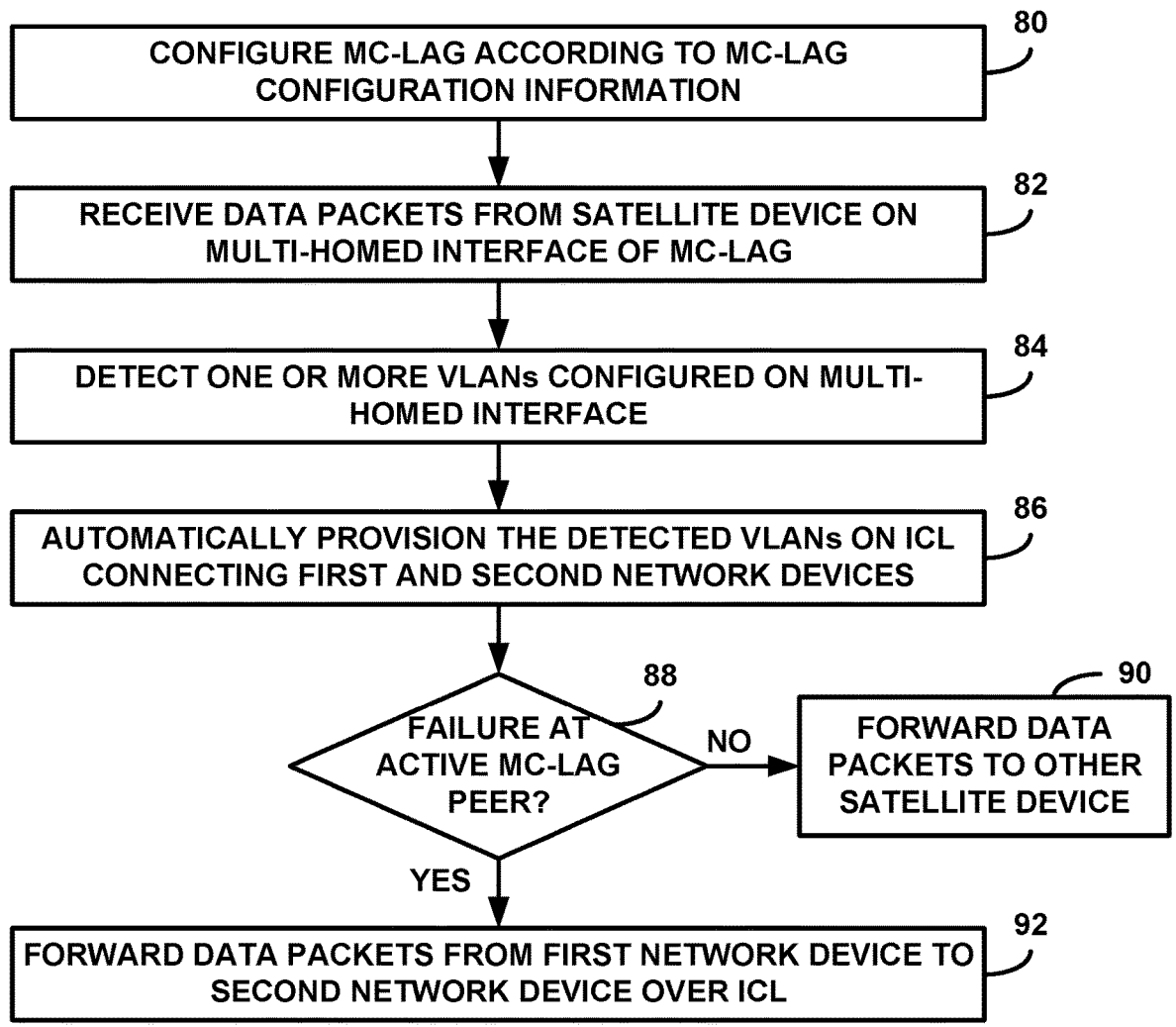
FIG. 4 is a flowchart illustrating an example operation of automatically provisioning one or more VLANs on an ICL within a MC-LAG, in accordance with techniques of this disclosure.

FIG. 4 is a flowchart illustrating an example operation of automatically provisioning one or more VLANs on an ICL within a MC-LAG, in accordance with techniques of this disclosure. The example operation is described herein with reference to aggregation device 50 from FIG. 3. In other examples, the operation may be performed by any of aggregation devices 30 within enterprise switch 18 from FIG. 2.

Aggregation device 50 configures a MC-LAG with another aggregation device according MC-LAG configuration information (80). The MC-LAG configuration information may be received from a user or administrator via CLI 63 of aggregation device 50. Configuring the MC-LAG may include setting aggregation device 50 to operate as an active MC-LAG peer device, and establishing an ICL between aggregation device 50 and the other aggregation device operating as a standby MC-LAG peer device. The ICL may be considered a backup link that provides inter-chassis redundancy in the case of a link failure between aggregation device 50 and one or more satellite devices, e.g., satellite devices 32 from FIG. 2. In this way, through inter-chassis redundancy, the other aggregation device may provide high availability of an enterprise switch that includes the MC-LAG.

Aggregation device 50 receives data packets from a satellite device on a multi-homed interface of the MC-LAG on aggregation device 50 (82). The multi-homed interface of the MC-LAG is a MCAE interface of the MC-LAG on each of aggregation device 50 and the other aggregation device within the MC-LAG. The multi-homed interface connects the satellite device to each of aggregation device 50 and the other aggregation device within the MC-LAG.

According to the techniques of this disclosure, VLAN unit 66 of aggregation device 50 detects one or more VLANs configured on the multi-homed interface on aggregation device 50 (84). In one example, VLAN unit 66 may detect the one or more VLANs based on one or more VLAN tags included in the received data packets, the one or more VLAN tags identifying the one or more VLANs. In this example, VLAN unit 66 may determine which VLANs are configured on the multi-homed interface based on the VLANs of the traffic ingressing on the multi-homed interface.

In another example, VLAN unit 66 may detect the one or more VLANs from VLAN table 61 of aggregation device 50. VLAN table 61 may identify both manually configured VLANs and automatically configured VLANs on the multi-homed interface and other interfaces on aggregation device 50. For example, VLAN unit 66 may use MVRP 60 to automatically configure VLANs on trunk interfaces (i.e., interfaces that carry traffic for two or more VLANs) of aggregation device 50 based on VLAN registration information received in MVRP packets. One or more VLANs may also be manually configured on the trunk interfaces by a user or administrator via CLI 63. In either case, the configured VLANs on each of the trunk interfaces of aggregation device 50 may be recorded in VLAN table 61.

VLAN unit 66 of aggregation device 50 then automatically provisions the detected one or more VLANs on the ICL connecting aggregation device 50 and the other aggregation device within the MC-LAG (86). For example, VLAN unit 66 may automatically configure ICL VLAN list 62 to include the detected one or more VLANs for the ICL. ICL VLAN list 62 may also include at least one manually configured VLAN on the ICL. In this example, aggregation device 50 may receive the manual configuration information for the at least one VLAN on the ICL from the user or administrator via CLI 63.

VLAN unit 66 may also continue to detect any changes to the VLANs configured on the multi-homed interface in order to automatically update the VLANs configured on the ICL. In some examples, VLAN unit 66 may detect the changes to the VLANs on the multi-homed interface by continuously monitoring the VLAN tags included in data packets received from satellite devices on the multi-homed interface. In other examples, VLAN unit 66 may detect the changes to the VLANs on the multi-homed interface by either continuously or periodically monitoring VLAN table 61 for changes to the recorded VLANs.

As described above, aggregation device 50 is set to operate as the active MC-LAG peer device and the other aggregation device within the MC-LAG is set to operate as the standby MC-LAG peer device. During normal operation in which active links at aggregation device 50 remain active (NO branch of 88), one of PFEs 54 of aggregation device 50 forwards the data packets received from the satellite device on the multi-homed interface to another satellite device (90). In the case where a failure occurs at aggregation device 50, e.g., an active link failure (YES branch of 88), one of PFEs 54 of aggregation device 50 forwards the received data packets from aggregation device 50 to the other aggregation device over the ICL (92).

Figure 5:
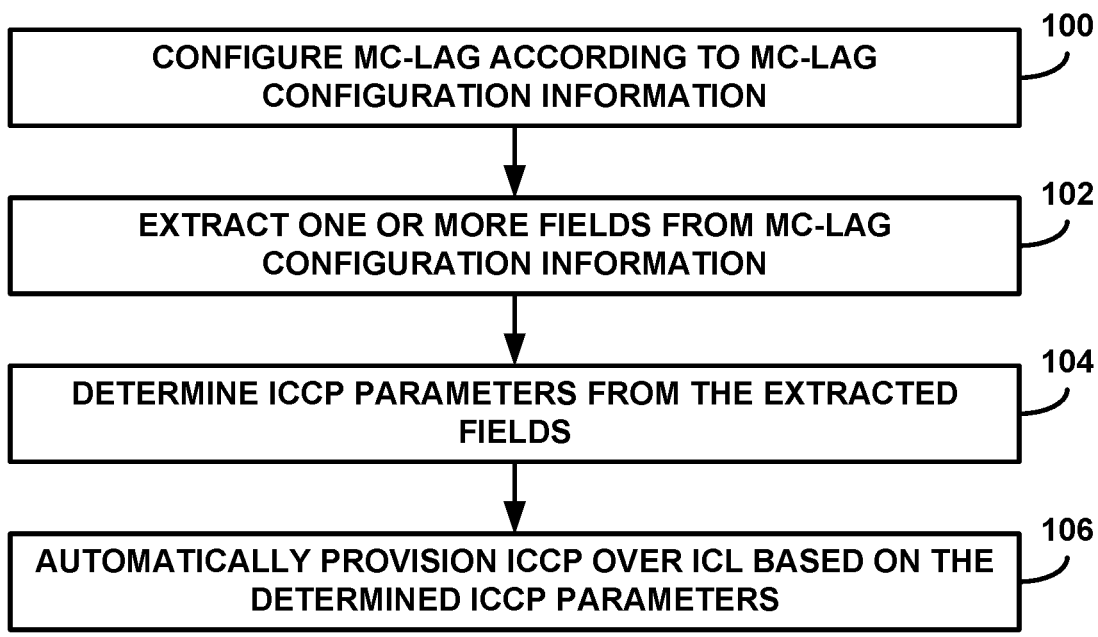
FIG. 5 is a flowchart illustrating an example operation of automatically provisioning ICCP over an ICL within a MC-LAG, in accordance with techniques of this disclosure.

FIG. 5 is a flowchart illustrating an example operation of automatically provisioning ICCP over an ICL within a MC-LAG, in accordance with techniques of this disclosure. The example operation is described herein with reference to aggregation device 50 from FIG. 3. In other examples, the operation may be performed by any of aggregation devices 30 within enterprise switch 18 from FIG. 2.

Aggregation device 50 configures a MC-LAG with another aggregation device according MC-LAG configuration information (100). The MC-LAG configuration information may be received from a user or administrator via CLI 63 of aggregation device 50. Configuring the MC-LAG may include setting aggregation device 50 to operate as an active MC-LAG peer device, and establishing an ICL between aggregation device 50 and the other aggregation device operating as a standby MC-LAG peer device. The ICL may be considered a backup link that provides inter-chassis redundancy in the case of a link failure between aggregation device 50 and one or more satellite devices, e.g., satellite devices 32 from FIG. 2. In this way, through inter-chassis redundancy, the other aggregation device may provide high availability of an enterprise switch that includes the MC-LAG.

According to the techniques of this disclosure, ICCP unit 64 of aggregation device 50 determines one or more parameters to configure ICCP 58 between aggregation device 50 and the other aggregation device within the MC-LAG from the MC-LAG configuration information. ICCP unit 64 may first extract one or more fields from the MC-LAG configuration information (102). For example, ICCP unit 64 may extract one or more of a local chassis identifier (ID), a redundancy group ID, and a peer chassis ID. ICCP unit 64 may then determine the one or more ICCP parameters from the extracted one or more fields (104). For example, ICCP unit 64 may determine a local IP address for aggregation device 50 from the local chassis ID, a list of redundancy groups to which aggregation device 50 belongs from the redundancy group ID, and a peer IP address for the other aggregation device within the MC-LAG from the peer chassis ID.

ICCP unit 64 automatically provisions ICCP 58 over the ICL between aggregation device 50 and the other aggregation device within the MC-LAG according to the determined ICCP parameters (106). Once ICCP 58 is configured over the ICL within the MC-LAG, aggregation device 50 may use ICCP 58 to exchange control information with the other aggregation device within the MC-LAG to provide inter-chassis redundancy. In addition, in the case of a link failure at aggregation device 50, aggregation device 50 may use ICCP 58 to coordinate the forwarding of received data packets from aggregation device 50 to the other aggregation device in the MC-LAG over the ICL.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or any other medium that can be used to store desired program code in the form of instructions or data structures and that can be accessed by a computer. The term "computer-readable storage media" refers to non-transitory, tangible storage media, and not connections, carrier waves, signals, or other transitory media.

Various examples have been described. These and other examples are within the scope of the following claims.

What is claimed is:

1. A method comprising:
configuring, by a first network device, a multi-chassis link aggregation group (MC-LAG) according to MC-LAG configuration information, the MC-LAG including the first network device and a second network device connected to the first network device by an inter-chassis link;
receiving, at a multi-homed interface of the MC-LAG on the first network device, data packets from a satellite device;
detecting, by the first network device, one or more virtual local area networks (VLANs) configured on the multi-homed interface;
automatically provisioning, by the first network device, the detected one or more VLANs on the inter-chassis link connecting the first network device and the second network device within the MC-LAG
determining, by the first network device and from the MC-LAG configuration information, one or more parameters for an inter-control center communications protocol (ICCP); and
automatically provisioning, by the first network device, the ICCP over the inter-chassis link according to the determined ICCP parameters,
wherein determining the one or more ICCP parameters comprises:
extracting one or more fields from the MC-LAG configuration information, including extracting one or more of a local chassis identifier (ID), a redundancy group ID, and a peer chassis ID, and
determining the one or more ICCP parameters from the extracted one or more fields, including determining a local Internet Protocol (IP) address for the first network device from the local chassis ID, a list of redundancy groups to which the first network device belongs from the redundancy group ID, and a peer IP address for the second network device from the peer chassis ID.

2. The method of claim 1, wherein detecting the one or more VLANs configured on the multi-homed interface comprises detecting the one or more VLANs based on one or more VLAN tags included in the received data packets, the one or more VLAN tags identifying the one or more VLANs.

3. The method of claim 1, wherein detecting the one or more VLANs configured on the multi-homed interface comprises detecting the one or more VLANs from a VLAN table stored at the first network device, wherein the VLAN table identifies at least one of manually configured VLANs or automatically configured VLANs on the multi-homed interface.

4. The method of claim 1, further comprising detecting a change to the one or more VLANs configured on the multi-homed interface, and, based on the detected change, automatically updating the one or more VLANs configured on the inter-chassis link.

5. The method of claim 1, wherein automatically provisioning the one or more VLANs on the inter-chassis link comprises automatically configuring a VLAN list for the inter-chassis link to include the detected one or more VLANs.

6. The method of claim 1, further comprising receiving, via a user interface of the first network device, manual configuration information for at least one VLAN on the inter-chassis link.

7. The method of claim 1, wherein the first network device comprises an active MC-LAG peer device and the second network device comprises a standby MC-LAG peer device, the method further comprising, in response to detecting a link failure at the active MC-LAG peer device, forwarding the received data packets from the first network device to the second network device over the inter-chassis link.

8. The method of claim 1, wherein the multi-homed interface of the MC-LAG comprises a multi-chassis aggregated Ethernet (MCAE) interface of the MC-LAG on each of the first network device and the second network device within the MC-LAG, wherein the multi-homed interface connects the satellite device to each of the first network device and the second network device.

9. A network device comprising:
a memory configured to store multi-chassis link aggregation group (MC-LAG) configuration information; and
one or more processors in communication with the memory and configured to:
configure a MC-LAG according to the MC-LAG configuration information, the MC-LAG including the network device and another network device connected to the network device by an inter-chassis link;
receive, at a multi-homed interface of the MC-LAG on the network device, data packets from a satellite device;
detect one or more virtual local area networks (VLANs) configured on the multi-homed interface;
automatically provisioning, by the network device, the detected one or more VLANs on the inter-chassis link connecting the network device and the another network device within the MC-LAG,
determine, by the first network device and from the MC-LAG configuration information, one or more parameters for an inter-control center communications protocol (ICCP); and
automatically provision, by the first network device, the ICCP over the inter-chassis link according to the determined ICCP parameters,
wherein, to determine the one or more ICCP parameters, the one or more processors are configured to:
extract one or more fields from the MC-LAG configuration information, including extracting one or more of a local chassis identifier (ID), a redundancy group ID, and a peer chassis ID, and
determine the one or more ICCP parameters from the extracted one or more fields, including determining a local Internet Protocol (IP) address for the first network device from the local chassis ID, a list of redundancy groups to which the first network device belongs from the redundancy group ID, and a peer IP address for the second network device from the peer chassis ID.

10. The network device of claim 9, wherein, to detect the one or more VLANs configured on the multi-homed interface, the one or more processors are configured to detect the one or more VLANs based on one or more VLAN tags included in the received data packets, the one or more VLAN tags identifying the one or more VLANs.

11. The network device of claim 9, wherein the memory is configured to store a VLAN table identifying at least one of manually configured VLANs or automatically configured VLANs on the multi-homed interface, and wherein, to detect the one or more VLANs configured on the multi-homed interface, the one or more processors are configured to detect the one or more VLANs from the VLAN table.

12. The network device of claim 9, wherein the one or more processors are configured to detect a change to the one or more VLANs configured on the multi-homed interface, and, based on the detected change, automatically update the one or more VLANs configured on the inter-chassis link.

13. The network device of claim 9, wherein, to automatically provision the one or more VLANs on the inter-chassis link, the one or more processors are configured to automatically configure a VLAN list for the inter-chassis link to include the detected one or more VLANs.

14. The network device of claim 9, wherein the network device comprises a user interface, and wherein the one or more processors are configured to receive, via the user interface, manual configuration information for at least one VLAN on the inter-chassis link.

15. The network device of claim 9, wherein the network device comprises an active MC-LAG peer device and the other network device comprises a standby MC-LAG peer device, and wherein the one or more processors are configured to, in response to a failure at the active MC-LAG peer device, forward the received data packets from the network device to the other network device over the inter-chassis link.

16. The network device of claim 9, wherein the multi-homed interface of the MC-LAG comprises a multi-chassis aggregated Ethernet (MCAE) interface of the MC-LAG on each of the network device and the other network device within the MC-LAG, wherein the multi-homed interface connects the satellite device to each of the network device and the other network device.

17. A non-transitory computer-readable storage medium storing instructions that when executed cause one or more programmable processors of a first network device to:
configure a multi-chassis link aggregation group (MC-LAG) according to MC-LAG configuration information, the MC-LAG including the first network device and a second network device connected to the first network device by an inter-chassis link;
receive, by a multi-homed interface of the MC-LAG on the first network device, data packets from a satellite device;
detect one or more virtual local area networks (VLANs) configured on the multi-homed interface;
automatically provision the detected one or more VLANs on the inter-chassis link connecting the first network device and the second network device within the MC-LAG;
determine, by the first network device and from the MC-LAG configuration information, one or more parameters for an inter-control center communications protocol (ICCP); and
automatically provision, by the first network device, the ICCP over the inter-chassis link according to the determined ICCP parameters,
wherein the instructions that cause the one or more programmable processors to determine the one or more ICCP parameters further cause the one or more programmable processors to:
extract one or more fields from the MC-LAG configuration information, including extracting one or more of a local chassis identifier (ID), a redundancy group ID, and a peer chassis ID; and
determine the one or more ICCP parameters from the extracted one or more fields, including determining a local Internet Protocol (IP) address for the first network device from the local chassis ID, a list of redundancy groups to which the first network device belongs from the redundancy group ID, and a peer IP address for the second network device from the peer chassis ID.

* * * * *